(12) United States Patent
Hong et al.

(10) Patent No.: US 7,465,072 B2
(45) Date of Patent: Dec. 16, 2008

(54) BACKLIGHT UNIT AND LIQUID CRYSTAL DISPLAY DEVICE USING THE SAME

(75) Inventors: Young-Tae Hong, Daegu (KR); Sang-Yun Lee, Gyeongsangbuk-do (KR); Sung-Keun Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 139 days.

(21) Appl. No.: 11/148,250

(22) Filed: Jun. 9, 2005

(65) Prior Publication Data

US 2006/0002147 A1    Jan. 5, 2006

(30) Foreign Application Priority Data

Jun. 23, 2004    (KR) ...................... 10-2004-0047254

(51) Int. Cl.
*F21V 7/04* (2006.01)
*F21V 5/00* (2006.01)

(52) U.S. Cl. ........................ 362/330; 362/601; 362/606; 362/607; 362/224

(58) Field of Classification Search ......... 362/600–634, 362/559–561, 26, 27, 29, 30, 299, 300, 330, 362/331, 333, 339, 223–225; 349/61–65
See application file for complete search history.

(56) References Cited

U.S. PATENT DOCUMENTS

| | | | |
|---|---|---|---|
| 6,011,602 A * | 1/2000 | Miyashita et al. | ........... 362/615 |
| 6,527,410 B2 * | 3/2003 | Yamaguchi | ................. 362/243 |

FOREIGN PATENT DOCUMENTS

| | | |
|---|---|---|
| JP | 2004-038009 | 2/2004 |
| JP | 2005-221619 | 8/2005 |
| WO | WO 95/14255 | 5/2005 |

* cited by examiner

*Primary Examiner*—Bao Q Truong
(74) *Attorney, Agent, or Firm*—McKenna Long & Aldridge LLP (57) ABSTRACT

A backlight unit includes: at least one lamp; and a plurality of optical sheets on the at least one lamp, the plurality of optical sheets having a micro-lens sheet.

7 Claims, 10 Drawing Sheets

FIG. 1

(related art)

FIG. 2
(related art)

BACK LIGHT

FIG. 3

(related art)

FIG. 4

*(related art)*

BACKLIGHT UNIT AND LIQUID CRYSTAL DISPLAY DEVICE USING THE SAME

This application claims the benefit of Korean Patent Application No. 2004-47254, filed in Korea on Jun. 23, 2004, which is hereby incorporated by reference in its entirety.

BACKGROUND OF THE INVENTION

1. Field of the Invention

The present invention relates to a backlight unit, and more particularly, to a backlight unit and a liquid crystal display (LCD) device using the same.

2. Description of the Related Art

Presently, LCD devices are being developed as the next generation of display devices because of they are light, thin, and consume less power. In general, an LCD device is a non-emissive display device that displays images using a refractive index difference utilizing optical anisotropy properties of a liquid crystal material that is interposed between two substrates.

Among the various type of LCD devices commonly used, active matrix LCD (AM-LCD) devices have been developed because of their high resolution and superiority in displaying moving images. The AM-LCD device includes a thin film transistor (TFT) in each pixel region as a switching device, a pixel electrode in each pixel region, and a second electrode used for a common electrode. One of the two substrates includes a plurality of gate lines and a plurality of data lines crossing the plurality of gate lines in a matrix to define a plurality of pixel regions. A thin film transistor having a gate electrode connected to the gate line, a source electrode connected to the data line, and a drain electrode spaced apart from the source electrode is positioned in each pixel region. Specifically, the thin film transistor is positioned adjacent to the crossing of a gate line and a data line. To drive the LCD device, the gate lines are sequentially driven and simultaneously the data lines are driven by applying a data voltage to the source electrode of the thin film transistor such that the data voltage is applied when the thin film transistor is in ON state.

Figure 1:
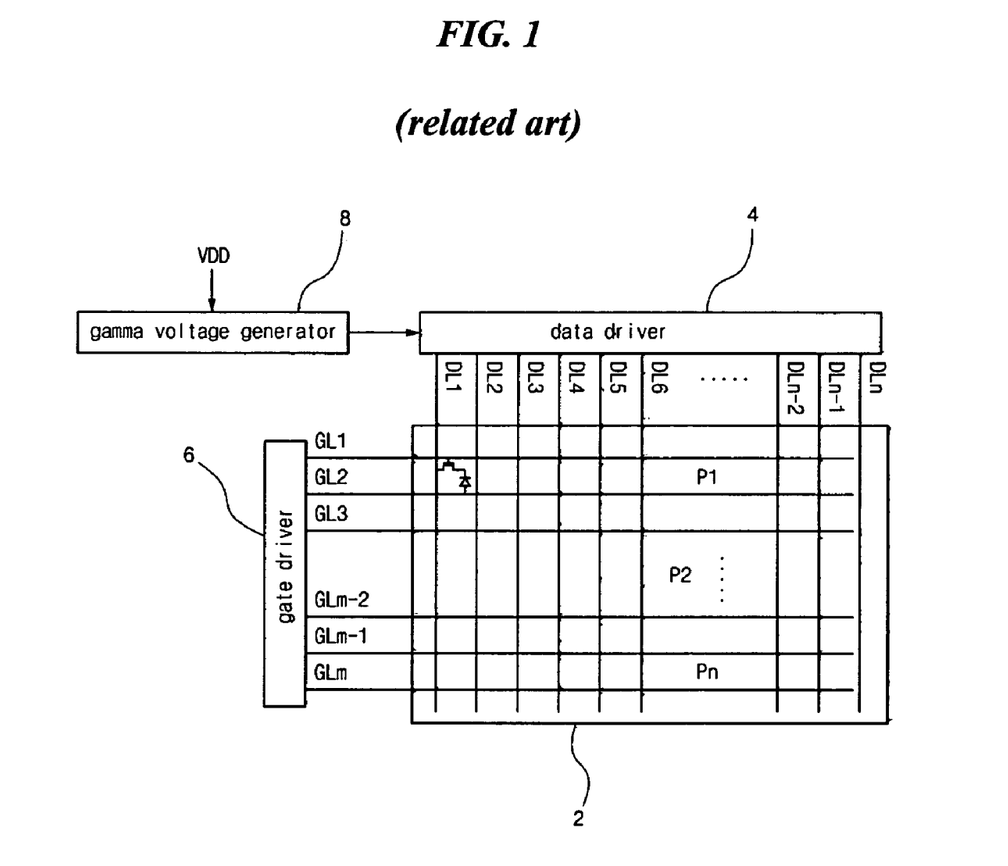
FIG. 1 is a schematic AM-LCD device according to the related art.

FIG. 1 is a schematic of an AM-LCD device according to the related art. As shown in FIG. 1, an LCD panel 2 includes a plurality of gate lines GL1 to $GL_m$ (m is a positive fixed number) and a plurality of data lines DL1 to $DL_n$ (n is a positive fixed number) crossing the plurality of gate lines GL1 to $GL_m$ to define a plurality of pixel regions P1 to $P_n$. A gate driver 6, a data driver 4 and a gamma voltage generator 8 are disposed outside the LCD panel 2 such that the gate driver 6 is connected to the plurality of gate lines GL1 to $GL_m$, the data driver 4 is connected to the plurality of data lines DL1 to $DL_n$, and the gamma voltage generator 8 is connected to the data driver 4. In the alternative, the data driver 4 may include the gamma voltage generator 8. Although not shown, forming the LCD panel 2 includes forming a thin film transistor on a first substrate and a pixel electrode connected to the thin film transistor, forming a color filter on a second substrate and a common electrode on the color filter, attaching the first and second substrates, and injecting a liquid crystal layer between the first and second substrates.

Figure 2:
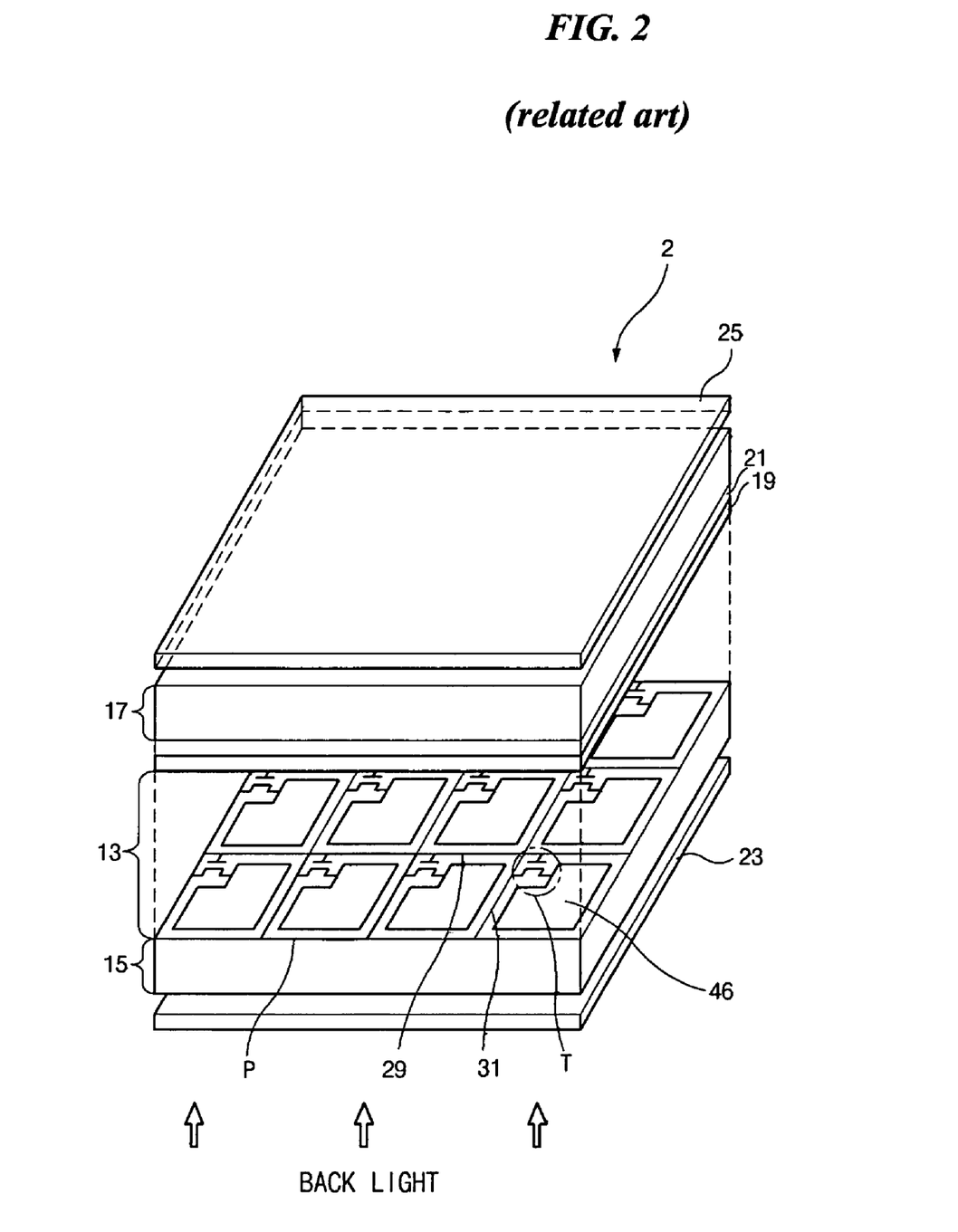
FIG. 2 is a perspective view of an LCD device according to the related art.

FIG. 2 is a perspective view of an LCD device according to the related art. As shown in FIG. 2, an LCD panel 2 includes a first substrate 15, a second substrate 17 facing the first substrate 15, and a liquid crystal layer 13 interposed between the first substrate 15 and the second substrate 17. A color filter 21 is formed on the second substrate 17 and a common electrode 19 is formed on the color filter 21. A plurality of thin film transistors T is formed on the first substrate 15. A thin film transistor T is positioned in a pixel region P defined within the display image unit.

A plurality of gate lines 29 and a plurality of data lines 31 crossing the plurality of gate lines 29 are formed on the first substrate 15. Each gate line 29 and each data line 31 are connected to a thin film transistor T. First and second polarizers 23 and 25 are disposed on the first substrate 15 and under the second substrate 17, respectively.

A polarized light from a backlight unit (not shown) under the LCD panel 2 is polarized by polarizer 23 and transmitted to the liquid crystal layer 13. When a voltage is applied to the liquid crystal layer 13, an arrangement of the liquid crystal layer 13 is changed. More particularly, a reflective index of the liquid crystal layer 13 is changed, thereby obtaining a desired image by polarization.

Figure 3:
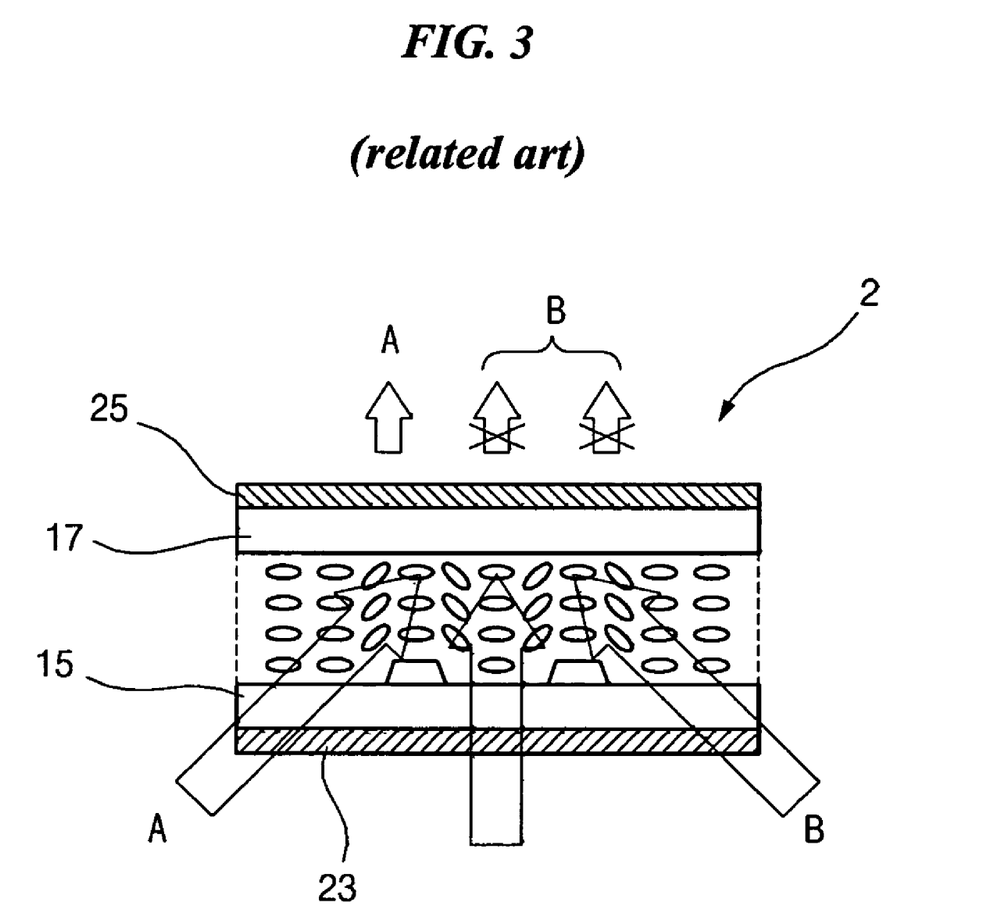
FIG. 3 is a cross-sectional view of an LCD device illustrating a polarization of light by a polarizer of the related art LCD device.
Figure 4:
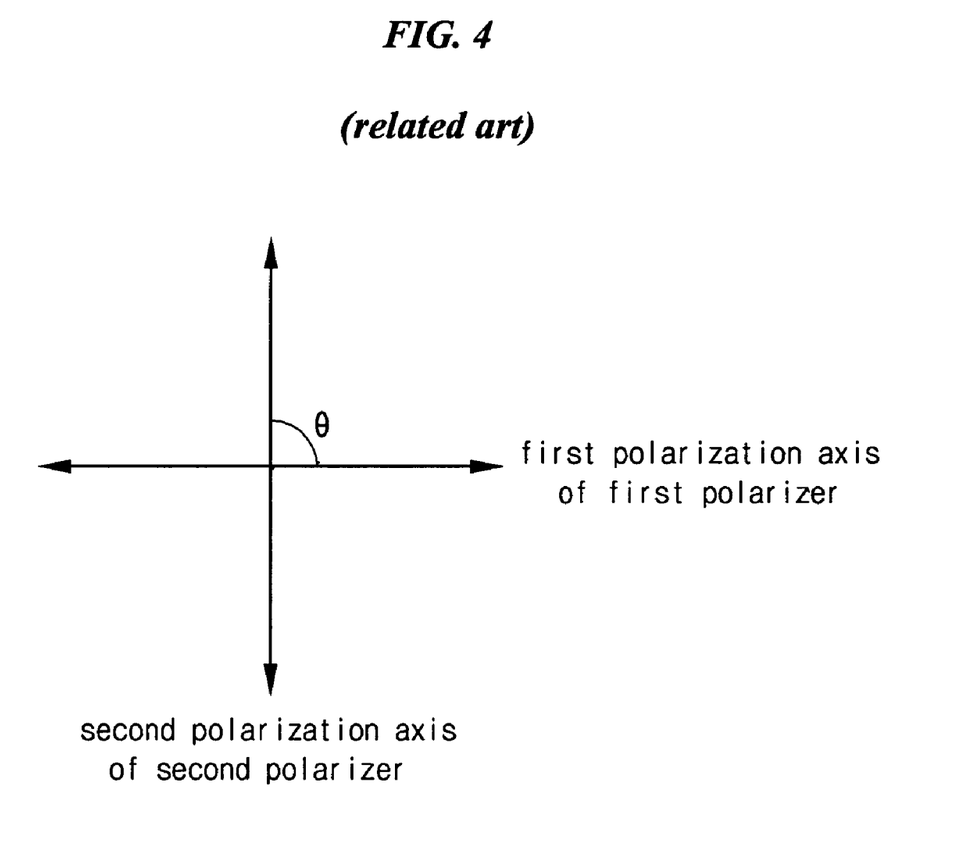
FIG. 4 is a schematic x-y graph showing a direction of polarization axis for first and second polarizers of FIG. 3 in the related art LCD device.

FIG. 3 is a cross-sectional view of an LCD device illustrating polarization of light by a polarizer of the related art LCD device. FIG. 4 is a x-y graph showing a direction of a polarization axis for first and second polarizers of FIG. 3 in the related art LCD device. As shown in FIG. 3, a LCD panel 2 corresponds to a normally black mode in that the LCD panel 2 has a black luminance in an OFF state. A first polarization axis of a first polarizer 25 under a first substrate 17 and a second polarization axis of a second polarizer 23 on a second substrate 15 are perpendicularly arranged at about 90 degrees (88 degrees to 92 degrees) with respect to each other.

A first light A from a backlight (not shown) includes all angles except 0, 90, 180 and 270 degrees and a second light B from the backlight includes angles of 0, 90, 180 and 270 degrees. When the first light A enters into the LCD panel 2, the first light A is not transmitted through the LCD panel by the first and second polarizers 25 and 23 when the LCD panel is in a black state. This is because none of the first light A directions correspond to one of the first polarization axis and the second polarization axis. In other words, the LCD panel 2 does not have a light leakage phenomenon in the black state when the first light A enters the LCD panel 2. Conversely, when the second light B enters the LCD panel 2, the second light B is not absolutely absorbed in the LCD panel 2 and a light leakage phenomenon can occur in the black state.

Figure 5A:
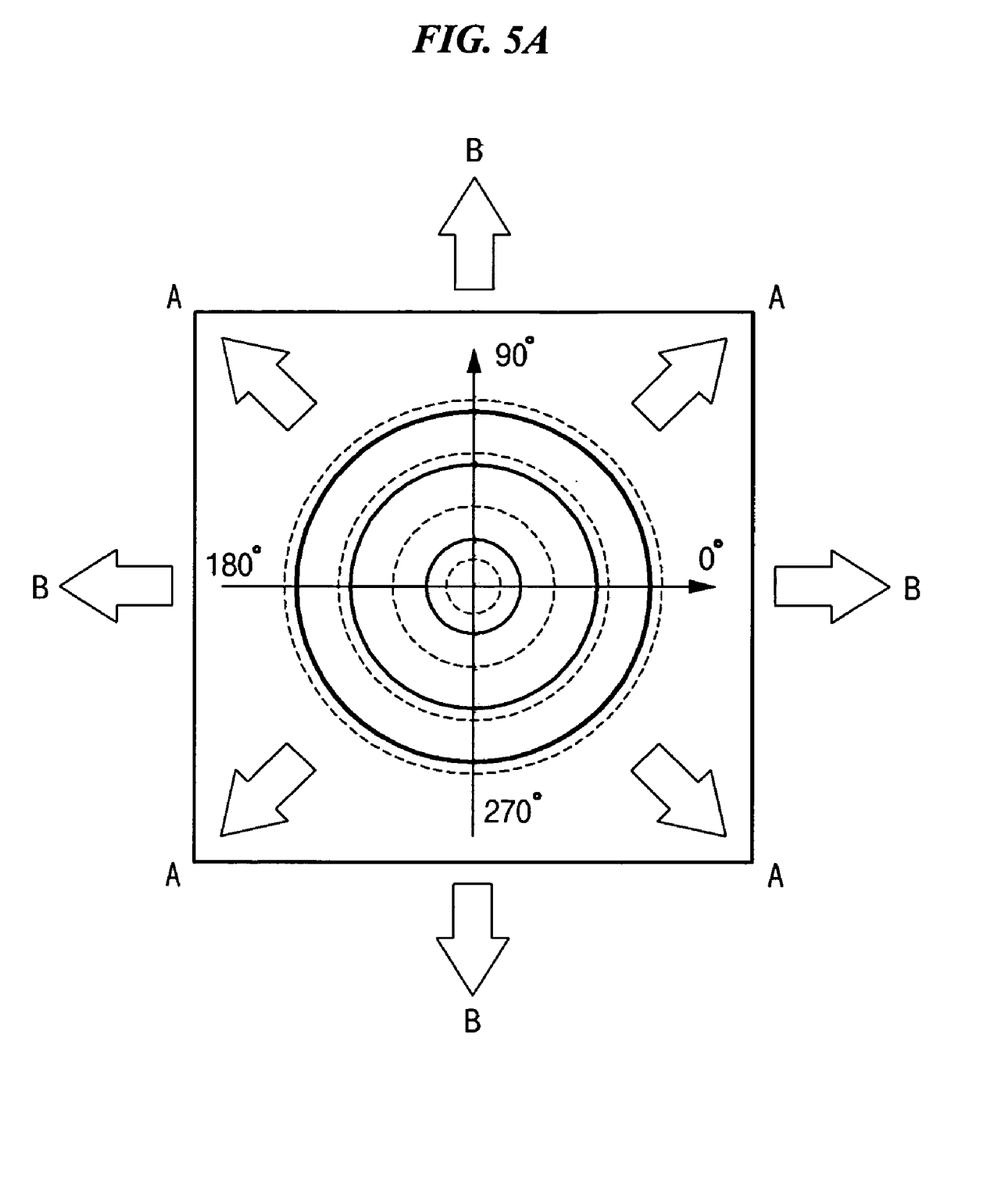
FIGS. 5A and 5B are schematic view showing a luminance distribution of the related art LCD device of FIG. 3.
Figure 5B:
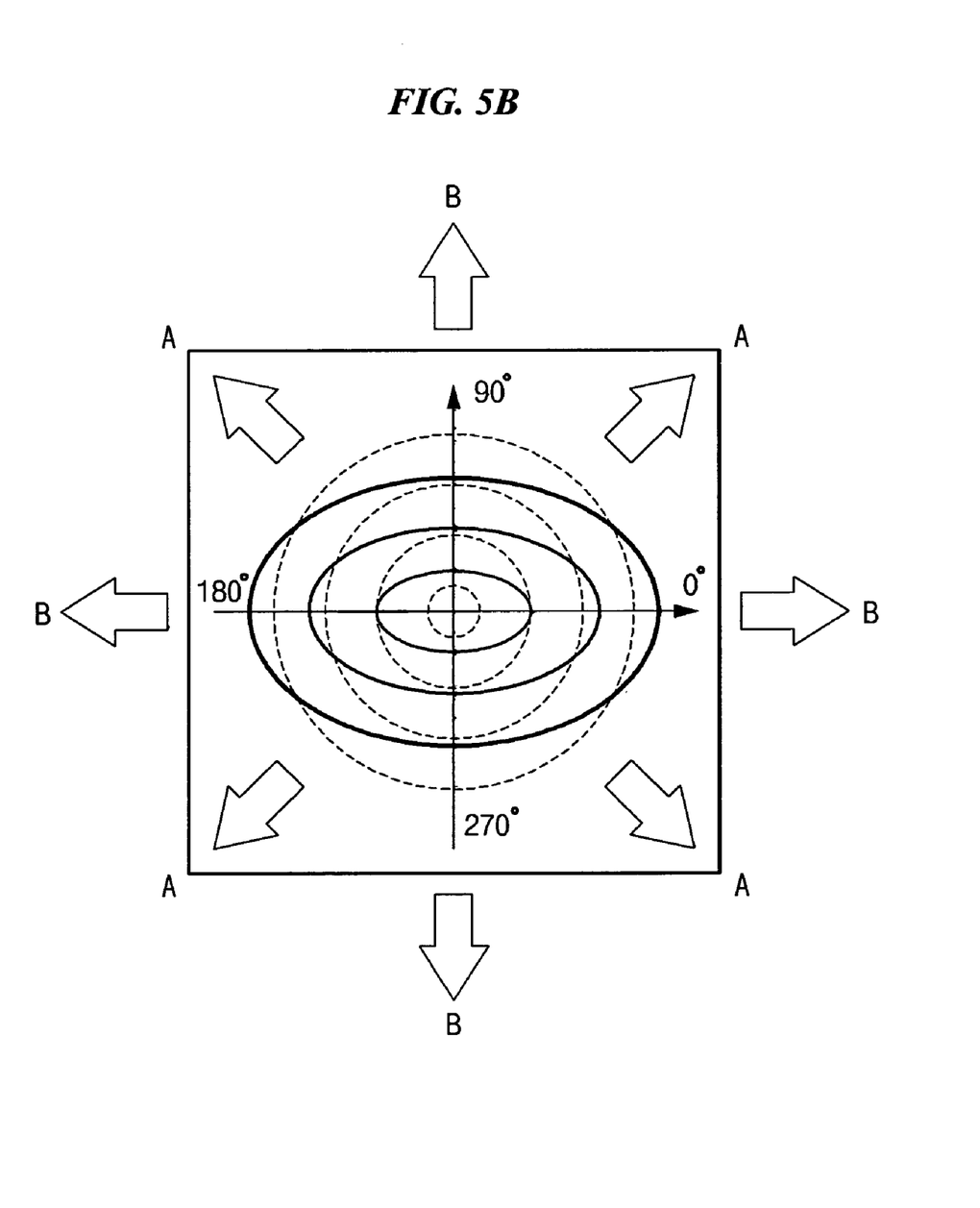

FIGS. 5A and 5B are illustrations showing a luminance distribution of the related art LCD device of FIG. 3. The luminance distribution for the first and second lights A and B from the backlight unit is generally circular or oval. Much of the second light B is coming from the backlight unit is transmitted through the related art LCD device during an OFF state. Therefore, a black luminance in the related art LCD device is increased and the contrast ratio of the LCD device is decreased.

SUMMARY OF THE INVENTION

Accordingly, the present invention is directed to a backlight unit and an LCD device using a backlight unit that substantially obviates one or more of the problems due to limitations and disadvantages of the related art.

An object of the present invention is to provide a backlight unit that can improve an image quality by controlling a luminance distribution of light.

Another object of the present invention is to provide an LCD using a backlight unit that can improve an image quality by controlling a luminance distribution of light.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes at least one lamp; and a plurality of optical sheets on the at least one lamp, the plurality of optical sheets having a micro-lens sheet.

In another aspect, a liquid crystal display device includes: a liquid crystal display panel, the liquid crystal display panel having a first substrate, a second substrate facing the first substrate, and a liquid crystal layer interposed between the first and second substrates; a first polarizer on the first substrate, the first polarizer having a first polarization axis; a second polarizer under the second substrate, the second polarizer having a second polarization axis crossing the first polarization axis; and a backlight unit under the second polarizer, the backlight unit having at least one lamp and a micro-lens sheet.

In another aspect, a liquid crystal display device includes: a liquid crystal display panel, the liquid crystal display panel having a first substrate, a second substrate facing the first substrate, and a liquid crystal layer interposed between the first and second substrates; a first polarizer on the first substrate, the first polarizer having a first polarization axis; a second polarizer under the second substrate, the second polarizer having a second polarization axis crossing the first polarization axis; and a backlight unit under the second polarizer, the backlight unit having at least one lamp and a plurality of optical sheets over the at least one lamp, the plurality of optical sheets having a micro-lens sheet to increase luminance of light from the backlight unit along polarization axes of the first polarizer and the second polarizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the illustrated embodiments of the present invention, examples of which are illustrated in the accompanying drawings. Wherever possible, the same reference numbers will be used throughout the drawings to refer to the same or the like parts.

Figure 6:
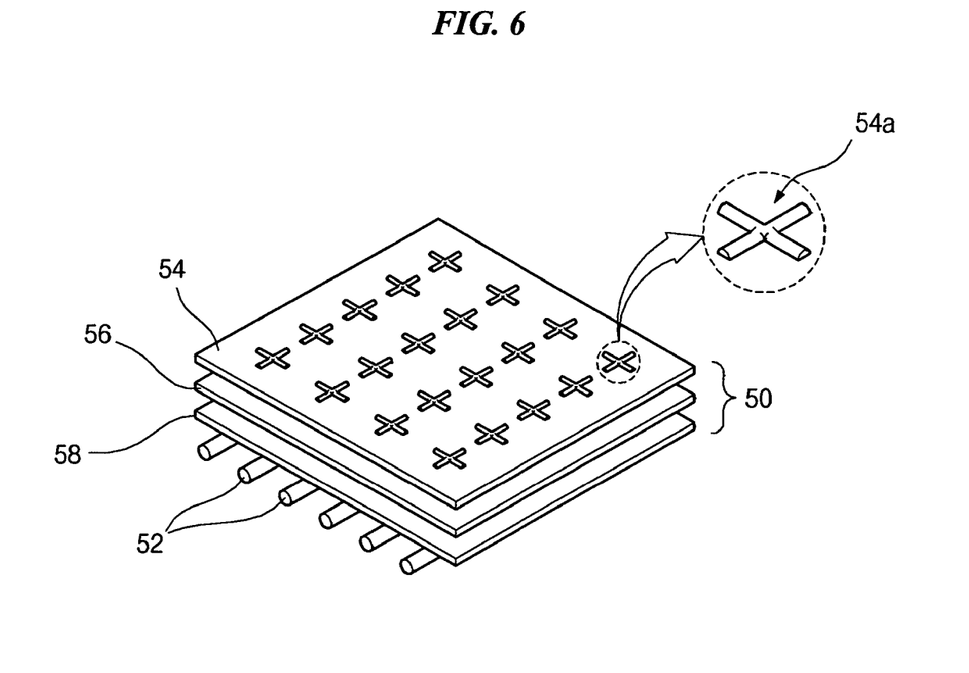
FIG. 6 is a perspective view of a backlight unit according to an embodiment of the present invention.
Figure 7:
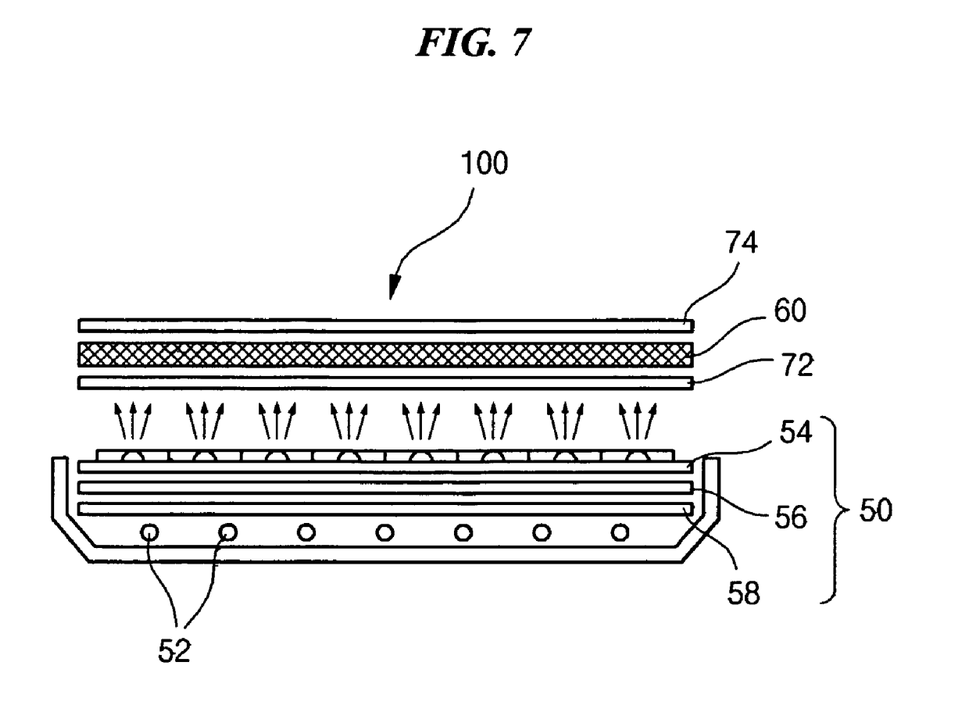
FIG. 7 is a plan view of an LCD device including a backlight unit according to an embodiment of the present invention.
Figure 8:
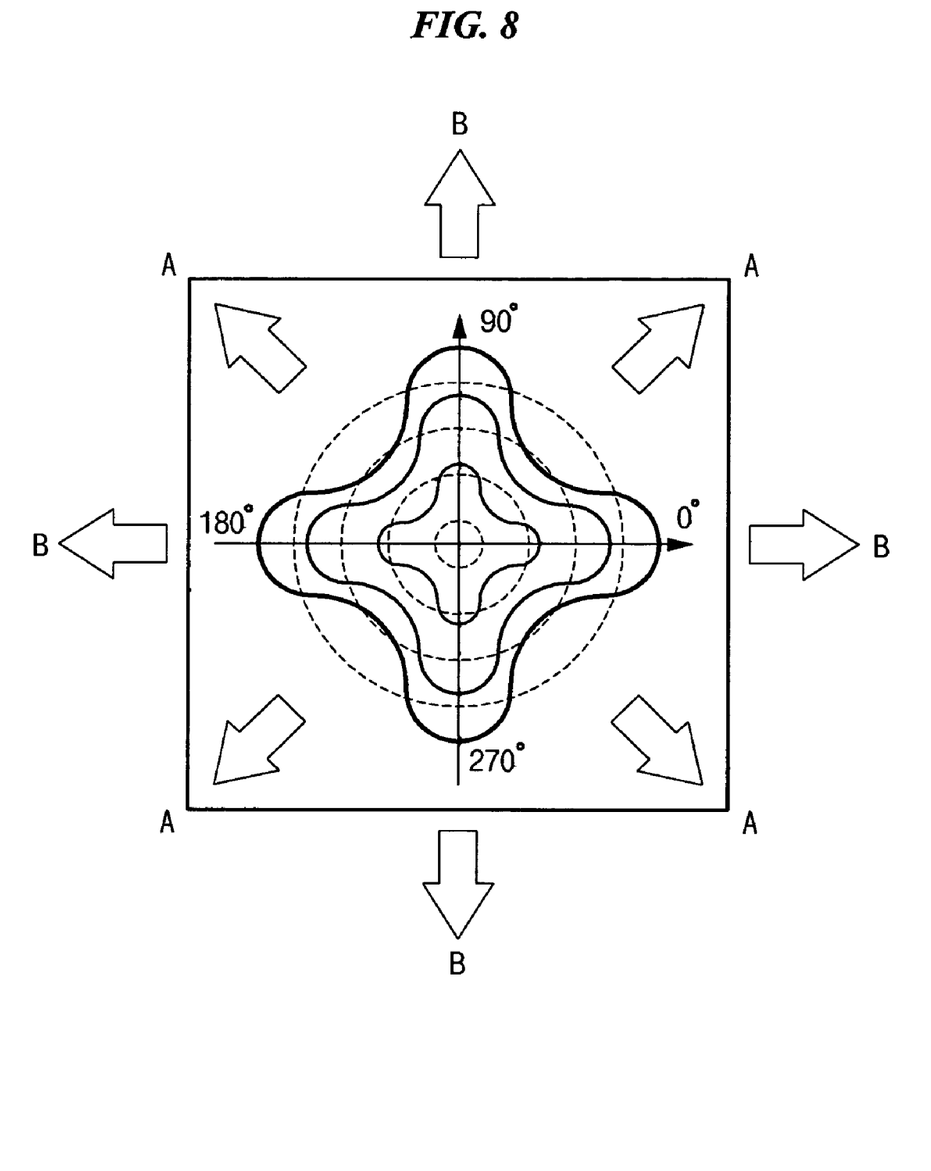
FIG. 8 is a schematic view showing a luminance distribution of an LCD device according to an embodiment of the present invention.

FIG. 6 is a perspective view of a backlight unit according to an embodiment of the present invention. FIG. 7 is a plan view of an LCD device including a backlight unit according to an embodiment of the present invention. FIG. 8 is a view showing a luminance distribution of an LCD device according to an embodiment of the present invention. For example, the backlight unit is a direct-type backlight in which the lamps are directly under the LCD device.

In FIGS. 6 to 8, a backlight unit 50 includes a plurality of lamps 52 and a plurality of optical sheets 54, 56 and 58 over the plurality of lamps 52. One of the plurality of optical sheets is a micro-lens sheet 54. The micro-lens sheet 54 can be the optical sheet positioned between the LCD device and another optical sheet. The micro-lens sheet 54 includes a plurality of convex lenses 54a, each of the plurality of convex lenses 54a has a cross shape. Specifically, each of the plurality of convex lenses 54a includes a first semi-cylindrical lens and a second semi-cylindrical lens crossing the first semi-cylindrical lens. Each of the plurality of convex lenses 54a includes a first axis 55a and a second axis 55b. The second axis 55b can be shorter than the first axis 55a. The first axis 55a corresponds to a lengthwise direction of the lamp 52. For example, the micro-lens sheet 54 can be formed of a transparent material, such as a synthetic resin.

As shown in FIG. 7, an LCD device 100 includes an LCD panel 60, a first polarizer 72 under the LCD panel 60, a second polarizer 74 on the LCD panel 60, and a backlight unit 50 under the first polarizer 72. The first polarizer 72 has a first polarization axis and the second polarizer 74 has a second polarization axis crossing the first polarization axis. Although not shown, the LCD panel 60 includes a first substrate, a second substrate facing the first substrate, and a liquid crystal layer interposed between the first and second substrates. A backlight unit 50 having a plurality of lamps 52 and a plurality of optical sheets 54, 56 and 58 over the lamps 52 is positioned under the LCD panel 60. The top optical sheet is a micro-lens sheet 54, which is positioned between the first polarizer 72 and another optical sheet 56.

The micro-lens sheet 54 is modified to increase luminance distribution of light from the backlight unit along polarization axes of the first polarizer 72 and second polarizer 74, as shown in FIG. 8, so as to reduce light leakage due to light having polarization axes different than the first and second polarizers 72 and 74. The micro-lens sheet 54 reorients or concentrates light so that the luminance distribution of the light from the backlight unit has a cross-shaped distribution along the polarization axes of the first polarizer 72 and the second polarizer 74. Accordingly, light distribution irradiated toward the LCD panel 60 from the backlight is substantially parallel to the polarization axes of the first and second polarizers 72 and 74, and hence, light causing an increase in black luminance is reduced. Thus, black luminance can be reduced and high contrast ratio can be obtained by reducing the amount of the light entering LCD panel 60 that is at all angles not substantially parallel to the polarization axes of the first and second polarizers 72 and 74.

Figure 9:
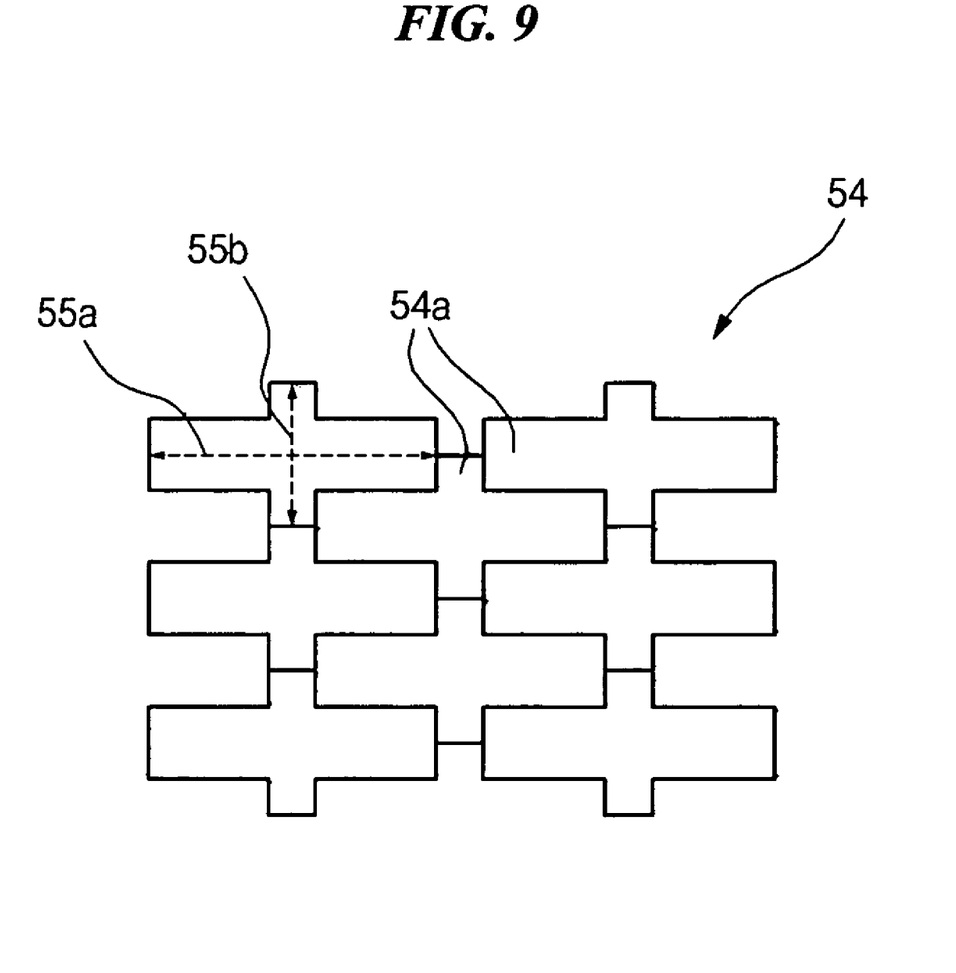
FIG. 9 is a plan view showing a micro-lens sheet having a plurality of convex lenses according to another embodiment of the present invention.

FIG. 9 is a plan view showing a micro-lens sheet having a plurality of convex lenses according to another embodiment of the present invention. A micro-lens sheet 54 includes a plurality of convex lenses 54a having a first axis 55a and a second axis 55b shorter than the first axis 55a. Here, the direction of the first axis 55a corresponds to the lengthwise direction of the lamp 52 (of FIG. 6). The backlight unit and the LCD device using the backlight unit according to the present invention improves contrast ratio by reorienting light applied to the liquid crystal display panel in the normally black mode to reduce light leakage. Further, since the black luminance is reduced by adding an optical sheet, such as a micro-lens sheet, improved image quality can be obtained.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
   at least one lamp; and
   a plurality of optical sheets over the at least one lamp, the plurality of optical sheets having a micro-lens sheet, wherein the micro-lens sheet includes a plurality of convex lenses and each of the plurality of convex lenses has a cross shape, and wherein facing end portions of two convex lenses are spaced apart from each other, wherein the two convex lenses are adjacent to each other along a direction, and a reference line connecting the facing end portions is parallel to the direction, and wherein a space between the facing end portions has a flat surface.

2. The backlight unit according to claim 1, wherein each of the plurality of convex lenses includes a first semi-cylindrical lens and a second semi-cylindrical lens crossing the first semi-cylindrical lens.

3. The backlight unit according to claim 1, wherein the plurality of convex lenses includes a first axis and a second axis shorter than the first axis, the first axis corresponds to a lengthwise direction of the at least one lamp.

4. The backlight unit according to claim 1, wherein the backlight unit is a direct-type backlight unit.

5. The backlight unit according to claim 1, wherein the micro-lens sheet is the top sheet of the plurality of optical sheets.

6. The backlight unit according to claim 1, wherein the micro-lens sheet is formed of a transparent material.

7. The backlight unit according to claim 6, wherein the transparent material is a synthetic resin.

* * * * *